United States Patent
El Hamss et al.

(10) Patent No.: US 12,294,989 B2
(45) Date of Patent: May 6, 2025

(54) METHODS AND APPARATUS FOR CONFIGURED GRANT TRANSMISSION IN UNLICENSED SPECTRUM

(71) Applicant: InterDigital Patent Holdings, Inc., Wilmington, DE (US)

(72) Inventors: Aata El Hamss, Laval (CA); Patrick Tooher, Montreal (CA); Faris Alfarhan, Montreal (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 433 days.

(21) Appl. No.: 17/442,533

(22) PCT Filed: Mar. 26, 2020

(86) PCT No.: PCT/US2020/025000
§ 371 (c)(1),
(2) Date: Sep. 23, 2021

(87) PCT Pub. No.: WO2020/198499
PCT Pub. Date: Oct. 1, 2020

(65) Prior Publication Data
US 2022/0174699 A1    Jun. 2, 2022

Related U.S. Application Data

(60) Provisional application No. 62/908,719, filed on Oct. 1, 2019, provisional application No. 62/840,549, filed (Continued)

(51) Int. Cl.
*H04W 72/1268* (2023.01)
*H04L 1/1812* (2023.01)
*H04W 72/23* (2023.01)

(52) U.S. Cl.
CPC ....... *H04W 72/1268* (2013.01); *H04L 1/1812* (2013.01); *H04W 72/23* (2023.01)

(58) Field of Classification Search
CPC . H04W 72/1268; H04W 72/23; H04W 72/04; H04L 1/1812
See application file for complete search history.

(56) References Cited

U.S. PATENT DOCUMENTS

2018/0006790 A1* 1/2018 Park ................. H04L 1/1664
2018/0176945 A1* 6/2018 Cao .................. H04L 1/1877
(Continued)

FOREIGN PATENT DOCUMENTS

CN    107483160 A    12/2017
EP    3609284 A1    2/2020

OTHER PUBLICATIONS

Interdigital Inc., "Discussion on configured grant enhancement for NR-U", 3GPP Tdoc R1-1904856, 3GPP TSG RAN WG1 Meeting #96bis, Xi'an, China, Apr. 8-12, 2019, 5 pages.
(Continued)

*Primary Examiner* — Jeong S Park
(74) *Attorney, Agent, or Firm* — Jamie T. Nguyen

(57) ABSTRACT

Methods, apparatus, systems, architectures and interfaces for performing a configured grant (CG) uplink (UL) transmission are provided. The method includes receiving configuration information associated with a plurality of CG configurations for CG UL transmission; determining to transmit the CG UL transmission according to any of: (1) a set of available channel bandwidths, (2) a number of code block groups (CBGs), and (3) transmission parameters associated with the CG UL transmission; selecting a first CG configuration according to any of: (1) the set of available channel bandwidths, (2) the number of code block groups (CBGs), and (3) the transmission parameters associated with the CG UL transmission; and transmitting any number of
(Continued)

CBGs as the CG UL transmission using resources associated with the selected first configuration, wherein the resources of the selected first CG configuration are entirely within the set of available channel bandwidths.

20 Claims, 7 Drawing Sheets

Related U.S. Application Data on Apr. 30, 2019, provisional application No. 62/824,529, filed on Mar. 27, 2019.

(56) References Cited

U.S. PATENT DOCUMENTS

| | | | | |
|---|---|---|---|---|
| 2018/0287752 | A1* | 10/2018 | Park | H04L 5/0044 |
| 2018/0316464 | A1* | 11/2018 | Stern-Berkowitz | H04L 1/1692 |
| 2019/0045533 | A1* | 2/2019 | Chatterjee | H04W 72/23 |
| 2019/0075589 | A1* | 3/2019 | Jeon | H04W 72/20 |
| 2019/0132862 | A1* | 5/2019 | Jeon | H04L 5/0098 |
| 2019/0253197 | A1* | 8/2019 | Babaei | H04L 1/188 |
| 2019/0327755 | A1* | 10/2019 | Xiong | H04L 5/0046 |
| 2021/0410177 | A1* | 12/2021 | Takeda | H04W 72/23 |

OTHER PUBLICATIONS

Interdigital, Inc., "Discussion on configured grant enhancement for NR-U", 3GPP Tdoc R1-1906765, 3GPP TSG RAN WG1 Meeting #97, Reno, USA, May 13-17, 2019, 4 pages.

3rd Generation Partnership Project, Technical Specification Group Radio Access Network; Evolved Universal Terrestrial Radio Access (E-UTRA); Physical layer procedures (Release 15), 3GPP TS 36.213 V15.0.0, Dec. 2017, 493 pages.

Interdigital, Inc., "Configured grant UCI for NR-U ", 3GPP Tdoc R1-1910942, 3GPP TSG RAN WG1 Meeting #98bis, Chongqing, China, Oct. 14-20, 2019, 4 pages.

Vivo, "Feature lead summary for Configured grant enhancement", 3GPP TSG WG1#96; 3GPP Tdoc R1-1903409; Athens, Greece, Feb. 25,-Mar. 1, 2019, 13 pages.

3rd Generation Partnership Project; Technical Specification Group Radio Access Network; NR; Medium Access Control (MAC) protocol specification (Release 15); 3GPP TS 38.321 V15.1.0, Mar. 2018, 67 pages.

NTT Docomo, Inc., "Offline discussions for enhanced configured grant PUSCH transmissions", 3GPP TSG RAN WG1 Meeting #96, R1-1903707, Athens, Greece, Feb. 25,-Mar. 1, 2019, 82 pages.

3rd Generation Partnership Project; Technical Specification Group Radio Access Network; Study on NR-based access to unlicensed spectrum (Release 16), 3GPP TR 38.889 V16.0.0, Dec. 2018, 8 pages.

3rd Generation Partnership Project; Technical Specification Group Radio Access Network; NR; Physical layer procedures for control (Release 15), 3GPP TS 38.213 V15.3.0, Sep. 2018, 101 pages.

Vivo, "Outcome of offline discussion on Configured grant enhancement", 3GPP TSG RAN WG1#97, R1-1907814, Reno, USA, May 13-17, 2019, 30 pages.

Qualcomm Inc., "New WID on NR-based Access to Unlicensed Spectrum", 3GPP Tdoc RP-182878, TSG RAN #82, Sorrento, Italy, Dec. 10-13, 2018, 8 pages.

Interdigital, Inc., "Configured grant UCI for NR-U", 3GPP Tdoc R1-1912699, 3GPP TSG RAN WG1 Meeting #99, Reno, USA, Nov. 18-22, 2019, 4 pages.

English Language Abstract, Chinese Publication No. 107483160A, published Dec. 15, 2017, 1 page.

* cited by examiner

METHODS AND APPARATUS FOR CONFIGURED GRANT TRANSMISSION IN UNLICENSED SPECTRUM

CROSS REFERENCE TO RELATED APPLICATIONS

This application is the National Stage entry under 35 U.S.C. § 371 of Patent Cooperation Treaty Application PCT/US2020/025000, filed 26 Mar. 2020 and claims the benefit of U.S. Provisional Application No. 62/824,529, filed 27 Mar. 2017 and U.S. Provisional Application No. 62/840,549 filed 30 Apr. 2019 and U.S. Provisional Application No. 62/908,719 filed 1 Oct. 2019, the contents of each of which are incorporated by reference herein.

BACKGROUND

The present invention relates to the field of communications and, more particularly, to methods, apparatus, systems, architectures and interfaces for communications in an advanced or next generation wireless communication system, including communications carried out using a new radio and/or new radio (NR) access technology and communication systems. NR access technology and communication systems may use unlicensed spectrum for wireless communications.

BRIEF DESCRIPTION OF THE DRAWINGS

Furthermore, like reference numerals in the figures indicate like elements, and wherein.

EXAMPLE NETWORKS FOR IMPLEMENTATION OF THE EMBODIMENTS

Figure 1A:
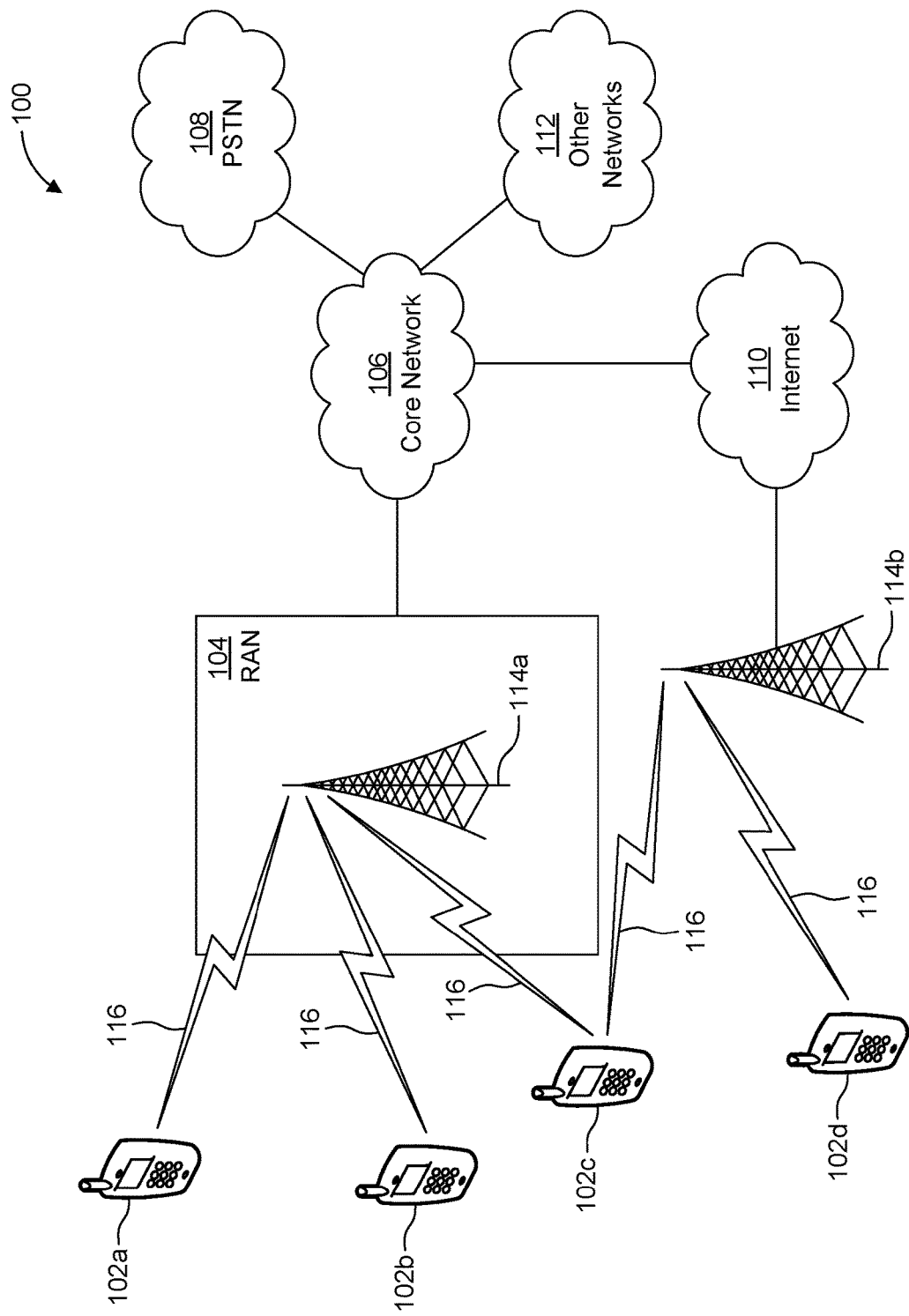
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
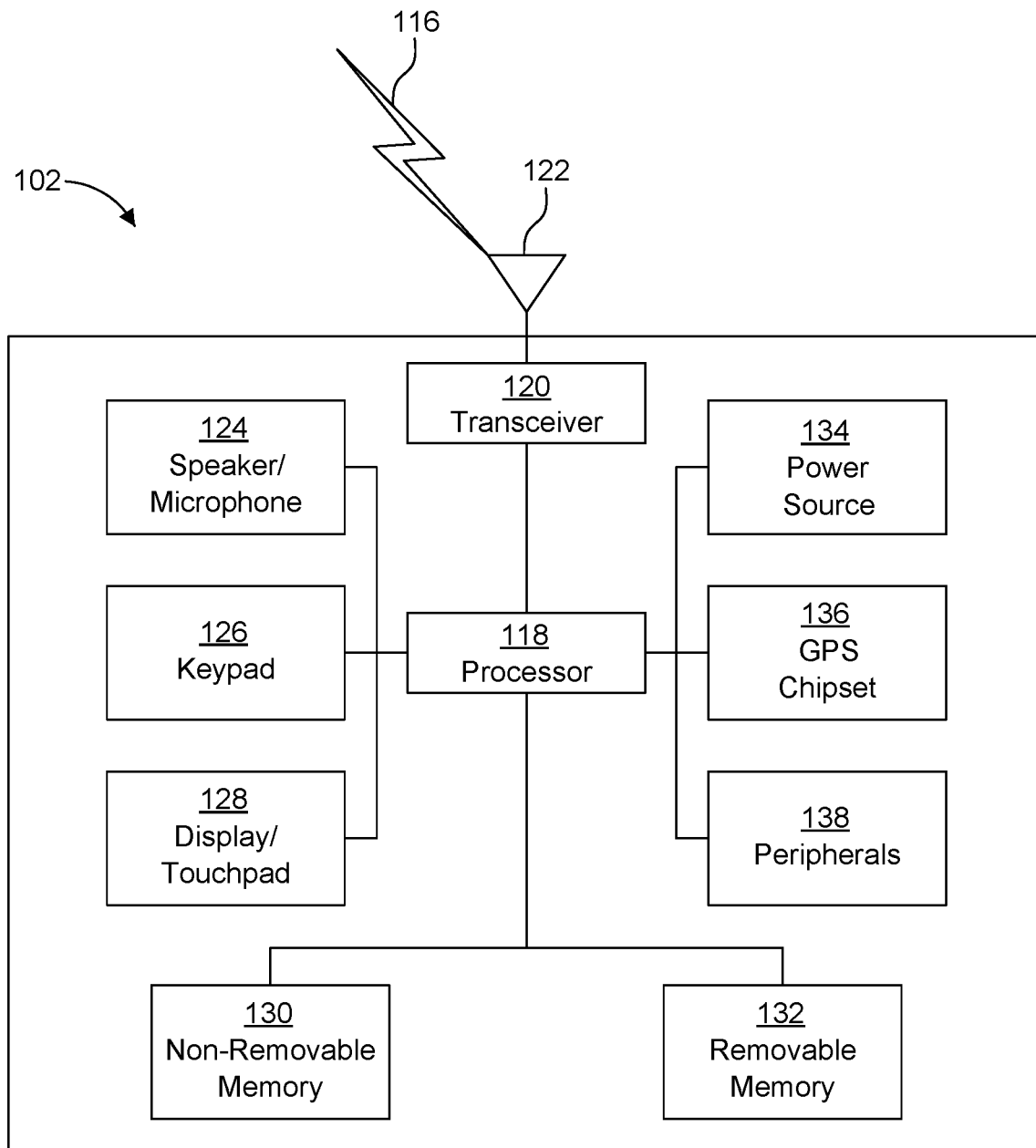
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
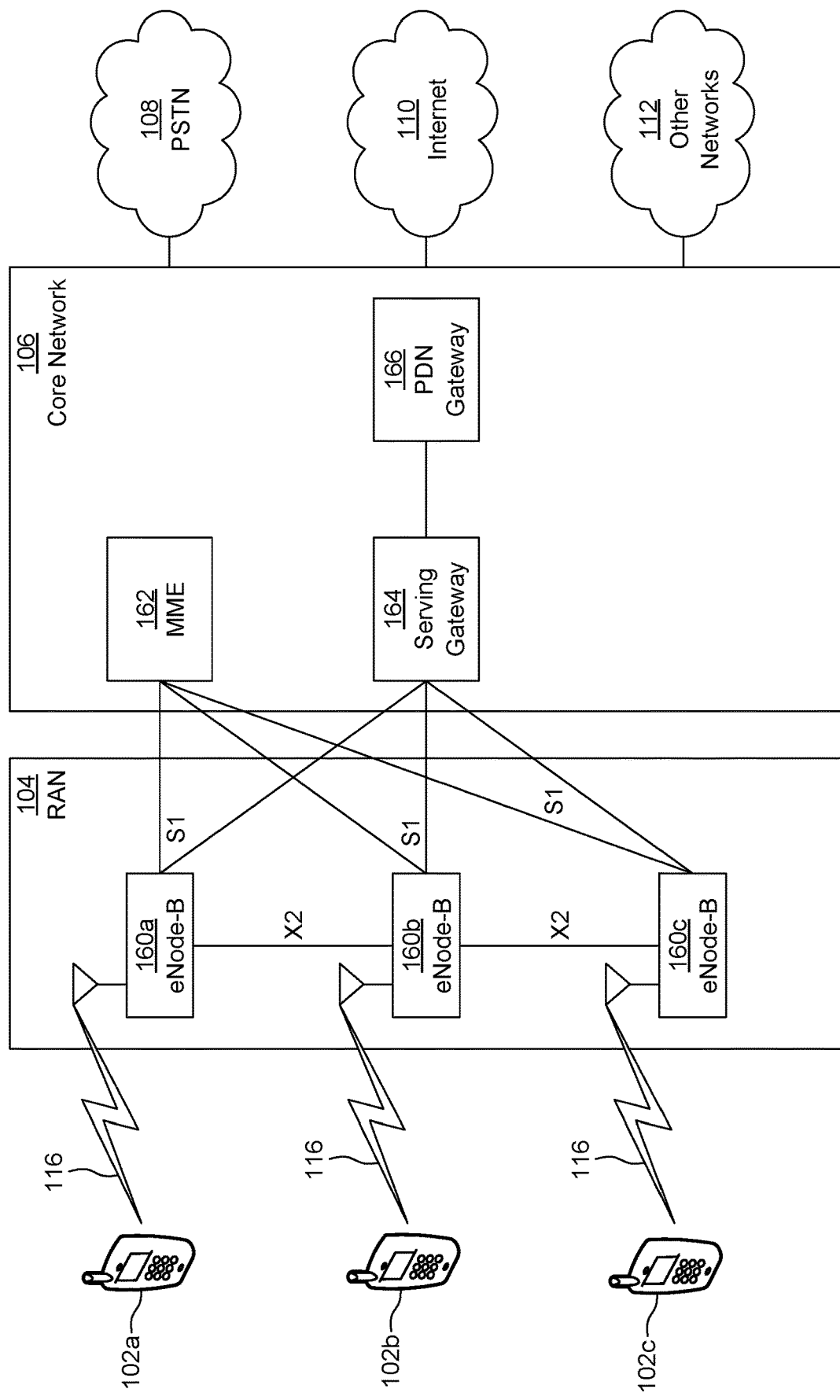
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
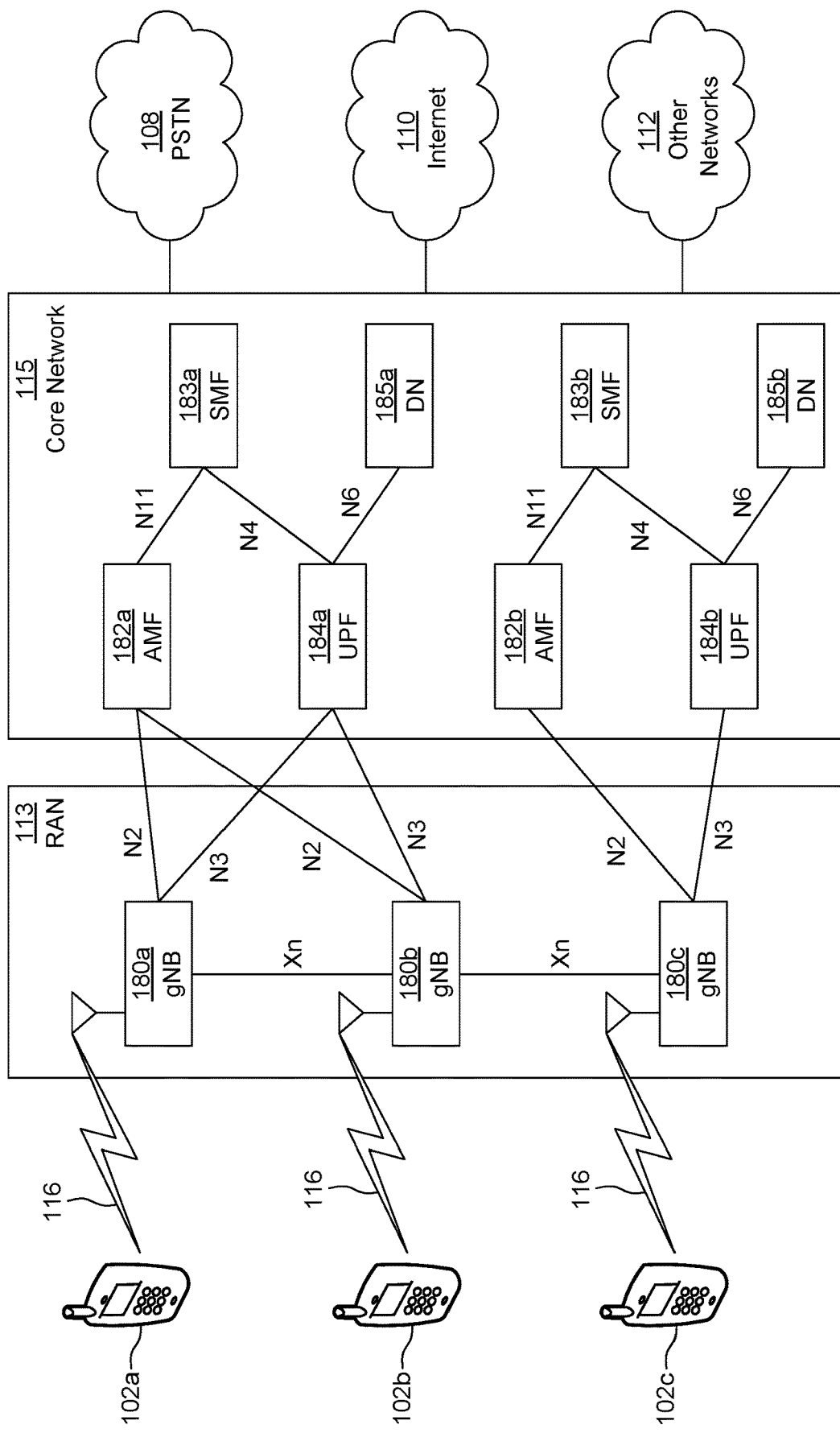
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an Nil interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Unlicensed Spectrum

Channel access in an unlicensed frequency band (e.g., unlicensed spectrum for unlicensed operation) uses (e.g., typically) a Listen-Before-Talk (LBT) mechanism. For example, a channel access procedure, such as and/or including a LBT mechanism (e.g., LBT operation/procedure), may be performed on an available channel bandwidth, which may be interchangeably referred to herein as an LBT bandwidth. In some cases, LBT may be mandated independently of whether a channel is occupied, and in other cases, immediate transmission, for example after a short switching gap may be applied. In the case of frame-based systems, LBT may be characterized by any of: a Clear Channel Assessment (CCA) time (e.g., ~20 μs), a Channel Occupancy time (COT) (e.g., a minimum of 1 ms, a maximum of 10 ms), an idle period (e.g., a minimum of 5% of channel occupancy time), a fixed frame period (e.g., equal to a sum of a channel occupancy time and an idle period), a short control signaling transmission time (e.g., a maximum duty cycle of 5% within an observation period of 50 ms), and a CCA energy detection threshold. In the case of load-based systems (e.g., a transmit and/or receive structure may not be fixed in time, and may vary according to a varying load), LBT may be characterized by a number N corresponding to a number of clear idle slots in extended CCA, for example, instead of a fixed frame period. N may be selected randomly within a range. In the case of Long Term Evolution (LTE), for unlicensed spectrum, there are two categories of CCA for each of uplink and downlink. According to the first category, a node senses the channel for N slot durations, where N is a random value selected from a range of values, (e.g., allowed values, a Contention Window). A contention window size and adjustments thereof may depend on a channel access priority.

New Radio (NR) technology, as specified by 3GPP, and unlike LTE, supports flexible transmission duration within a slot. NR also supports a "configured grant" for uplink transmissions, such that a network may semi-statically configure an uplink grant and a WTRU may (e.g., autonomously) use it, for example, without a layer 1 (L1) indication/activation. Further, NR introduced a (e.g., new) feature, referred to as code block group (CBG) based transmissions, for example, to support large BW allocations for a (e.g., given) transport block (TB). In the case of CBG transmissions, a transport block (e.g., having a large size) may be divided into multiple CBGs. In such a case, instead of acknowledging the entire transport block with a single Acknowledgement (ACK)/Negative ACK (NACK) bit, multiple Hybrid Automatic Repeat Request (HARQ) bits may be used to acknowledge each CBG. In such as case, a transmitter may only retransmit NACKed CBGs, for example, instead of retransmitting the entire TB.

3GPP has started a work item to support NR operation in unlicensed bands (NR-U, e.g., NR for unlicensed spectrum), and within the scope of the work item is an objective to specify NR-based operation in unlicensed spectrum. Such NR-based operation in unlicensed spectrum may include any of initial access, scheduling, HARQ, and mobility operations, along with methods and/or operations allowing for coexistence with LTE-License Assisted Access (LAA) and other incumbent Radio Access Technologies (RATs). Deployment scenarios may include any of: different stand-alone NR-based operation, different variants of dual connectivity operation (e.g., E-UTRA-NR Dual Connectivity (EN-DC) with at least one carrier operating according to the LTE RAT and/or NR Dual Connectivity (DC) with at least two sets of one or more carriers operating according to the NR RAT), and/or different variants of carrier aggregation (CA), for example, also including different combinations of zero or more (e.g., any number of) carriers of each of LTE and NR RATs. NR-U may support any of configured grant transmissions and CBG based transmissions for a configured grant, which may be referred to as a CG.

CBG based transmissions and/or retransmissions for a configured uplink grant may not be supported (e.g., originally) in NR. That is, in the case of NR Release 15 (Rel-15), a configured grant transmission may be for (e.g., was targeting) ultra-reliable low latency communication (URLLC) type of service, for example, with a small amount of data to be transmitted. In the case of NR-U spectrum, a configured grant may be for (e.g., is targeting) reducing the latency of uplink transmissions. In such a case, a WTRU may be configured semi-statically with a (e.g., configured) uplink (UL) grant and may autonomously start transmission whenever data is available, for example, instead of performing an LBT prior to transmitting a scheduling request, and receiving a downlink control information to schedule the uplink grant, which is also preceded by an LBT from the gNB.

In the case of NR-U, because the configured uplink grant (e.g., according to the configured uplink grant configuration) may support different TB sizes, having a Radio Resource Control (RRC) configuration indicating a (e.g., single) TB size to be used by a WTRU in the (e.g., configured) uplink grant configuration is not efficient. As such, there may be a problem with respect to configuring a resource with a large TB size that may not be (e.g., fully) used by a WTRU (e.g., all the time). Further, there may be a problem with respect to configuring a resource with a small TB size that is not suitable for CBG based transmissions.

According to embodiments, NR-U may include (e.g. use of) multiple configured grant configuration as well as procedures for a WTRU to select a (e.g., associated) resource.

Code Block Group Activation and/or Deactivation

According to embodiments, there may be a new class and/or a new type of product convolutional codes that may be referred to as Difference-Triangle Set (DTS)-Product Convolutional Codes (PrCCs). According to embodiments, DTS-PrCCs may (e.g., significantly) reduce decoding complexity and/or latency as compared to other types of product convolutional codes. According to embodiments, DTS-PrCCs may provide pre-served and/or improved error-correction performance. Further, according to embodiments, DTS-PrCCs may allow for higher throughputs and/or smaller decoding complexity for the use cases and associated constraints of interest.

According to embodiments, a CBG may be activated and/or deactivated for a CG transmission. According to embodiments, a WTRU may be configured to (e.g., dynamically) enable and/or disable CBG-based transmission, for example, for a CG uplink transmission. A WTRU may enable CBG transmission based on any of the following: an active BWP size; a number of CG(s) selected for transmissions by a WTRU at a (e.g., given) slot and/or transmission opportunity; any of a number of PRBs, a number of symbols within a slot, and the MCS of the selected CG (e.g., a number of information bits the CG may carry); a number associated with (e.g., an identifier of) an interlace and/or number of interlaces of a CG configuration; a bandwidth size of an unlicensed channel; any of: a number of LBT sub-bands acquired by a WTRU and a size of a LBT bandwidth (e.g., an available channel bandwidth) acquired by a WTRU; a number of LBT sub-bands to which the CG maps; a buffer size status of a WTRU; an indication from a gNB (e.g. a base station); channel measurements; and signal measurement information, such as a received signal strength indication (RSSI) measured within a sub-band containing the CG resource.

According to embodiments, in the case of an active BWP size, a WTRU may be configured to use CBG-based transmission for a BWP size above a threshold, such as 10 MHz. According to embodiments, in the case of a number of CG selected for transmissions by a WTRU at a (e.g., given) slot and/or transmission opportunity, a WTRU may select two CGs to be transmitted at a given slot, and the WTRU may (e.g., then) enable CBG based transmission and transmit two CBGs on each CG. According to embodiments, in the case of any of a number of PRBs, a number of symbols within a slot, and the modulation and coding scheme (MCS) of the selected CG, a WTRU may be configured with a CG with information bits above a threshold, and the WTRU may (e.g., then) activate CBG-based transmission for this CG. According to embodiments, in the case of any of the number of LBT sub-bands acquired by the WTRU and the size of the LBT bandwidth (e.g., an available channel bandwidth) acquired by the WTRU, a WTRU may receive a TB (e.g., from the MAC layer) that may be transmitted in whole when the WTRU acquires two sub-bands. In such a case, the WTRU may transmit a CBG-based transmission if it acquires only 1 sub-band to transmit part of the TB.

According to embodiments, in the case of a number of LBT sub-bands to which the CG maps, a CG resource may map to multiple LBT sub-bands, and the WTRU may (e.g., only) acquire a subset of all the required LBT sub-bands. Further, in such a case, the WTRU may use a CBG, for example, to enable puncturing of the data that maps to unacquired LBT sub-bands). According to embodiments, in the case of a buffer size status of a WTRU, a WTRU may enable CBG based transmission if its buffer contains N bits, which is above a configured threshold. According to embodiments, in the case of an indication from the gNB, a WTRU may be configured with multiple CG configurations. In such a case, the gNB may activate a CG with an indication, for example, information indicating whether a CBG-based transmission may be used or not.

According to embodiments, in the case of channel measurements, a WTRU may activate CBG based transmission, for example, if the interference level measured on the resources of a CG is not constant, that is, if a measured interference level varies in different RBs. In such a case, a WTRU may (e.g., then) activate CBG based transmission to receive multi-bit HARQ-ACK feedback and may map each CBG to different RBs, for example, that are experiencing different channel variations, such as measured interference levels.

According to embodiments, in the case of RSSI measured within the sub-band containing the CG resource, a WTRU may be configured with multiple CGs configuration within a different sub-band. In such a case, a WTRU may select one of the CG resources and may (e.g., further) determine whether to use CBG transmission based on the RSSI of the sub-band. For example, if the RSSI is above a configured threshold, the CBG transmission may be activated.

According to embodiments, a WTRU may be configured to semi-statically use a CBG-based transmission, for example, for a given UL CG transmission. In such a case, a WTRU may be configured to (e.g., always) use a CBG based transmission for a CG having any of a large BW allocation and multiple symbols and/or slots.

Multiple Configured Grant Configurations

According to embodiments, multiple configured grant configurations may be used for any of CG and/or CBG based transmission. According to embodiments, a WTRU may be configured with multiple CG configurations, for example, to be used for a CBG transmission. According to embodiments, a WTRU may be configured semi-statically with any number of (e.g., a set of) CGs. Further, each CG may include any of: any number of PRBs, any number of symbols, and a modulation and coding scheme, for example, to be used for transmission within that configured grant.

According to embodiments, a WTRU may be configured to select multiple CGs, for example, to transmit a TB that includes any number of (e.g., multiple) CBGs, and, for example, each CBG may map to a CG. According to embodiments, a WTRU may be configured to select a number of CGs, for example, based on any of a TB size and/or a configured maximum number of CBGs. According to embodiments, a WTRU may select CG resources, for example, based on whether CG resources are adjacent in time and/or frequency. That is, CG resources being adjacent in time may enable the WTRU to perform a single LBT prior to transmitting on all the CG resources.

According to embodiments, a WTRU may attempt LBT prior to the first CG resource, and in a case where the LBT is successful, the WTRU may not perform LBT for the remainder of associated CG resources. In a case where the LBT fails, the WTRU may be able to perform LBT prior to the second CG resource. According to embodiments, in the case of successful LBT, the WTRU may transmit prior to the second resource, and the WTRU may continue transmitting for the remainder of the resources. According to embodiments, in the case of failed LBT, e.g., failure to acquire a channel prior to the second resource, a WTRU may attempt to acquire the channel prior to the third CG resource, and so on.

According to embodiments, a mapping of CBGs may depend on the timing of a first acquired, possibly adjacent, CG resource. For example, the WTRU may (e.g., always) send the CBGs in order, for example, starting from the time of the first acquired CG resource. According to embodiments, a WTRU may drop CBGs mapped to (e.g., specific) CG resources associated with a channel that was not acquired. According to embodiments, a WTRU may use cyclic shifts to transmit the CBGs. For example, in a case where the WTRU acquires a channel prior to an X-th CG resource, the WTRU may transmit an X-th CBG. Further, the WTRU may continue until the last CBG is transmitted and may (e.g., then) append the first (X-1)-th CBGs that were originally dropped due to the channel not being acquired.

According to embodiments, a WTRU may be configured with any number of (e.g., one) CGs which contain any number of (e.g., multiple) resources for CBG based transmissions. For example, multiple resources of the CG may be contiguous in frequency. According to embodiments, a CG may contain (e.g., include, have, etc.) two resources, for example, such that a first resource ends at PRB n and a second resource starts at PRB n+1. According to embodiments, multiple resources may be configured to have (e.g., such that they are separated with) a frequency offset within the BWP. According to embodiments, any number of (e.g., multiple) resources of a CG may be continuous in a time domain. For example, a CG may contain two resources, such that the first resource starts at symbol 7 and the second resource starts at symbol 8. According to embodiments, any number of (e.g., multiple) resources of a CG may be non-contiguous in a time domain.

According to embodiments, any of a CBG and sub-band (e.g., sub-channel) LBT may be applied to CG transmission. According to embodiments, a WTRU may be configured with a CG spanning (e.g., associated with, covering, containing, etc.) any number of (e.g., multiple) sub-bands (e.g. a sub-band may be 20 MHz). According to embodiment, in a case where a WTRU is configured with a CG containing multiple resources, any number of (e.g., each) resources may be in different (e.g., respective) sub-bands. According to embodiments, for example, in the previously noted case, a WTRU may (e.g., then) use different (e.g., respective) resources for CBG-based transmissions. In such a case, there may be an increase in the probability of accessing the channel on unlicensed spectrum (e.g., increased LBT success), since the WTRU may perform multiple channel access processes per sub-band (i.e. LBT processes per sub-band). In such a case, if transmission in any number of (e.g., one) of the sub-bands fails (e.g. the WTRU fails to access a sub-band), then the retransmission may be (e.g., only) performed for the failed CBG transmission. According to embodiments, a WTRU may be configured to use the sub-band on which retransmissions succeeded (e.g., a sub-band on which the transmission succeeded for retransmission(s)).

According to embodiments, a WTRU may be configured with multiple CGs, and for example, each CG may be within (associated with, included in, contain, etc.) a different sub-band (e.g., a sub-band equal to 20 MHz or any other suitable and/or similar frequency range that is used as any of a sub-band and/or sub-channel). According to embodiments, a WTRU may (e.g., then) use a different CG for CBG-based transmission. For example, two CBGs may be transmitted in two different CGs in different (e.g., respective) sub-bands. According to embodiments, for CBG retransmission, a WTRU may select (e.g., fewer or more) CGs based on feedback of (e.g., associated with initially) transmitted CBGs.

According to embodiments, a WTRU may adapt its interlacing, for example, depending (e.g., based on, according to, etc.) on the number of CG resources acquired. For example, in a case where a single CG resource is acquired, a WTRU may use multiple interlaces, for example, to achieve higher throughput. According to embodiments, and, for example, on the other hand, in a case of where multiple (e.g., and contiguous in frequency) CG resources are (e.g., successfully) acquired, a WTRU may use fewer (e.g. a single) interlace to transmit data.

Configured Grant(s) Selection

According to embodiments, a WTRU may select a configured grant (CG). According to embodiments, a WTRU may be configured to select any number of CGs, for example, according to (e.g., based on) whether CBG-based transmission is enabled (or not). For example, a WTRU may be configured to dynamically enable and/or disable CBG-based transmission. Upon enabling CBG based transmission, a WTRU may select a CG having (e.g., with) a number of resources that is equal to the number of activated CBGs. As another example, in a case where a WTRU selects multiple CGs, each CG may correspond to a (e.g., respective) CBG transmission. In such a case, a WTRU may be configured to enable two CBGs. According to embodiments, a WTRU may (e.g., then) select two CGs to transmit CBGs.

According to embodiments, a WTRU may be configured to select any number of CGs according to (e.g., based on) the WTRU's buffer status. According to embodiments, a WTRU may be configured with multiple CGs, and each CG may have different TB size (TBS) and/or number of (e.g., information, data, etc.) bits to carry. According to embodiments, a WTRU may (e.g., then) select the CG with any of TBS and/or number of bits that satisfy the WTRU's buffer status needs. For example, a WTRU may be configured with N CGs that have TBS and/or number of information bits equal to $\{S1, S2, \ldots, SN\}$. In such a case, the WTRU's buffer may contain X information bits to be transmitted, and the WTRU may select $S_j=\min\{S_i, s \cdot S_i - X \geq 0\}$.

According to embodiments, a WTRU may be configured to select any of a (e.g., one) CG with multiple resources or multiple CGs, for example, according to (e.g., based on) any of: an LBT outcome; a time domain allocation of the CGs; frequency domain allocation of the CG; logical channel priority and/or latency requirement; logical channel group; uplink timing alignment; measured RSSI per sub-band; channel quality/load on the resources configured for CGs; transmission rate and LCP parameters; delay and/or time; and HARQ-ACK status of the previous transmission(s) performed using CGs.

According to embodiments, in the case of a WTRU selecting any of a CG with multiple resources or multiple CGs according to an LBT outcome (e.g., a channel access outcome), a WTRU may perform multiple independent LBTs, for example, on different CGs resource configuration(s), on different sub-bands, and may select a CG(s) on a sub-band on which channel access succeeded. According to embodiments, in such a case, a WTRU may re-select another CG configuration, for example, if the number of LBT failures and/or LBT attempts on a sub-band is larger than a value, for example, a configured threshold. According to embodiments, such threshold may be configured to the WTRU semi-statically, for example, using RRC signaling, higher layers, or may be fixed according to specification.

According to embodiments, in the case of a WTRU selecting any of a CG with multiple resources or multiple CGs according to a time domain allocation of the CGs, a WTRU may select multiple CGs having a small duration and with a same transmission time, for example, so that the latency may be reduced and the channel occupancy time (COT) may be shared with the gNB to transmit the HARQ-ACK feedback.

According to embodiments, in the case of a WTRU selecting any of a CG with multiple resources or multiple CGs according to logical channel priority and/or latency requirement, a WTRU may select a CG based on a priority, for example, a priority of one or multiple logical channels (LCH) in a MAC PDU. In such a case, a WTRU may be configured with a mapping between CGs and LCH priorities, and, for example, based on the LCH priority(ies) within the MAC PDU, a WTRU may select an appropriate CG.

According to embodiments, in the case of a WTRU selecting any of a CG with multiple resources or multiple CGs according to uplink timing alignment, a WTRU may be configured with CGs on any of different sub-bands and different carriers, for example, experiencing different uplink timings. According to embodiments, a WTRU may select a CG on a different sub-band and/or carrier, for example, if it is (e.g., determined by the WTRU to be) time-aligned. According to embodiments, a WTRU may perform LBT on sub-bands and/or carriers on which the WTRU is uplink time-aligned.

According to embodiments, in the case of a WTRU selecting any of a CG with multiple resources or multiple CGs according to measured RSSI per sub-band, a WTRU may be configured to measure RSSI per sub-band. For example, in such a case, a WTRU may select a CG configuration based on whether the measured RSSI, for example, per sub-band, is less than a threshold.

According to embodiments, in the case of a WTRU selecting any of a CG with multiple resources or multiple CGs according to channel quality/load on the resources configured for CGs, a WTRU may select a CG in order to maintain a certain radio channel quality condition. In such a case, a WTRU may select (e.g., only) CG(s) on sub-bands and/or carriers for which the measured RSRP and/or RSRQ metric is above value, such as a certain threshold that is pre-determined or configured by higher layers.

According to embodiments, in the case of a WTRU selecting any of a CG with multiple resources or multiple CGs according to transmission rate and LCP parameters, a WTRU may select or prioritize active CG(s) on which the most amount of data may be transmitted. In such a case, a WTRU may select and/or prioritize active CG(s) on which the most amount of data of a certain priority may be transmitted. According to embodiments, such priority may be predetermined and/or preconfigured. According to embodiments, a WTRU may select or prioritize active CG(s) on which data of the highest priority can be transmitted.

According to embodiments, in the case of a WTRU selecting any of a CG with multiple resources or multiple CGs according to delay and/or time, a WTRU may be configured to prioritize a subset of CGs, for example, the subset having certain periodicity, if the time elapsed since the PDU was constructed is larger than a certain threshold. According to embodiments, a WTRU may select and/or prioritize a subset of CGs, for example, that (e.g., may, could, do, etc.) meet a QoS latency and/or deadline, for example, configured by higher layers. According to embodiments, a WTRU may select and/or prioritize a subset of CGs that may meet a deadline for re-ordering, for example, provided by higher layers.

According to embodiments, in the case of a WTRU selecting any of a CG with multiple resources or multiple CGs according to HARQ-ACK status of the previous transmission(s) performed using CGs, a WTRU may be configured with multiple CGs and may select one CG for transmissions. In such a case, a WTRU may (e.g., then) determine that a large number (e.g. above a threshold) of transmissions were NACKed and/or the HARQ-ACK feedback is not received, and the WTRU may (e.g., then) select a different CG configuration for subsequent transmissions.

Figure 2:
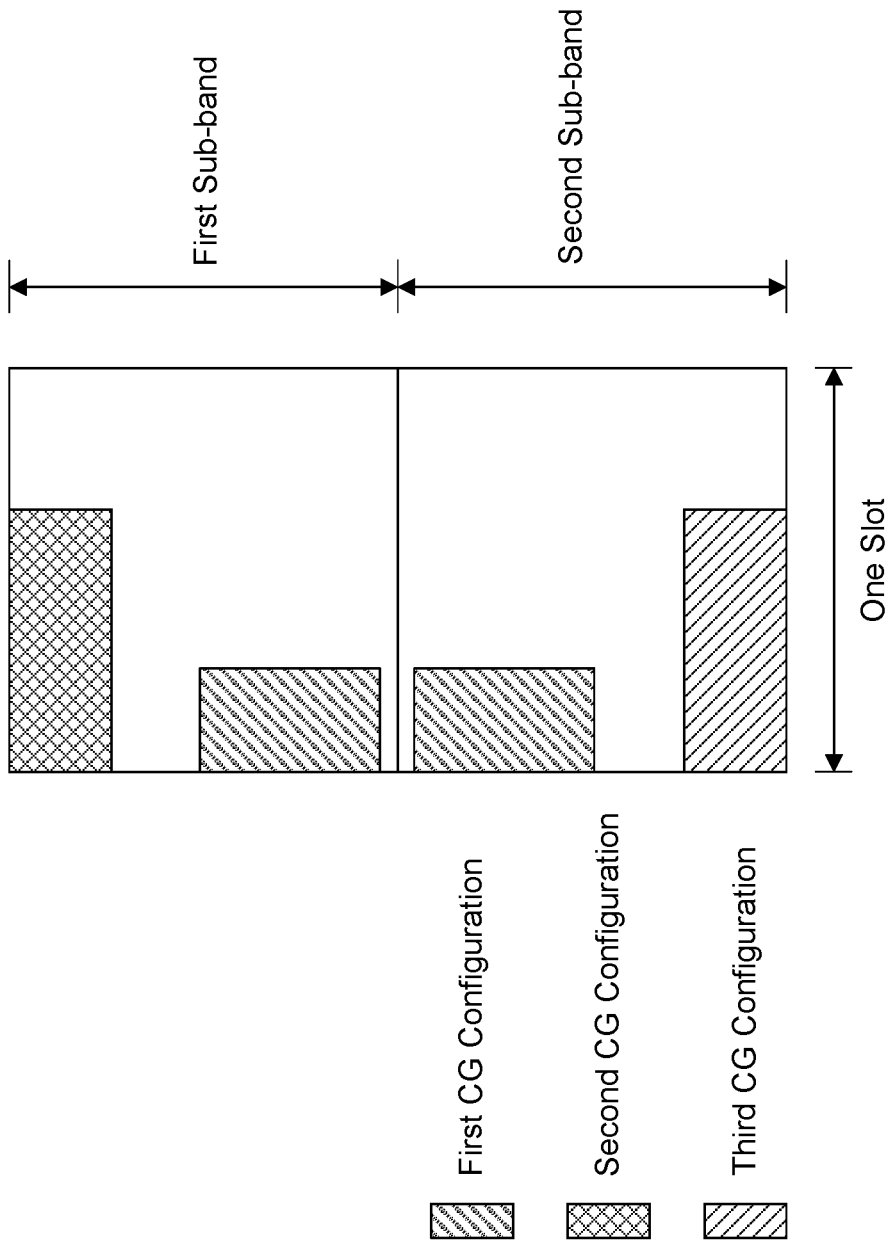
FIG. 2 is a diagram illustrating multiple CG configuration per sub-band according to embodiments.

FIG. 2 is a diagram illustrating multiple CG configuration per sub-band according to embodiments.

According to embodiments, a WTRU may be configured with multiple CGs, for example, located (e.g., disposed, included, etc.) in different (e.g., respective) sub-bands. Furthermore, a WTRU may be configured with multiple sub-bands on which channel access may be performed. According to embodiments, a WTRU may, prior to transmission, prepare multiple (e.g., potential) transmission configurations. According to embodiments, after performing a channel access procedure, a WTRU may select one of the (e.g., potential) transmission configurations, for example, based on the success and/or failure of the channel access procedure. For example, there may be a case where a WTRU is configured with two sub-bands and 3 CG configurations. In such a case, a first CG configuration may occupy first and second sub-bands with a 3 symbol transmission duration within a slot. Further, in such a case, a second CG configuration may occupy the first sub-band with a 6 symbol transmission duration within the slot, and a third CG configuration may occupy the second sub-band with a 6 symbol transmission duration within the slot.

According to embodiments, a WTRU may, for example, after performing the channel access procedure, determine that the first sub-band is accessible (e.g., a LBT succeeded on the sub-band), and the second sub-band is not accessible (e.g., a LBT failed). In such a case, the WTRU may (e.g., then) select the second CG configuration, for example, which spans only the first sub-band. According to embodiments, a WTRU may, for example, after performing the channel access procedure, determine that first and the second sub-band are accessible (e.g., LBT succeeded in both sub-bands). In such a case, the WTRU may (e.g., then) select the first CG configuration, for example, which spans (e.g., over) two sub-bands. In this case, the transmission may occupy a smaller duration and may allows the WTRU to share the COT with the gNB, for example, to send the HARQ feedback for the CG transmission, or, for example, to free the medium to give more probability to other UEs to access the channel. According to embodiments, a configuration of (e.g., having, including, indicating, etc.) multiple CGs at the same slot may be sent by the network, for example, to any number of WTRUs. That is, such a configuration may be sent because not all (e.g., only a part) of the configuration may be used by a WTRU at a time instance, for example, to increase resource usage efficiency.

Figure 3:
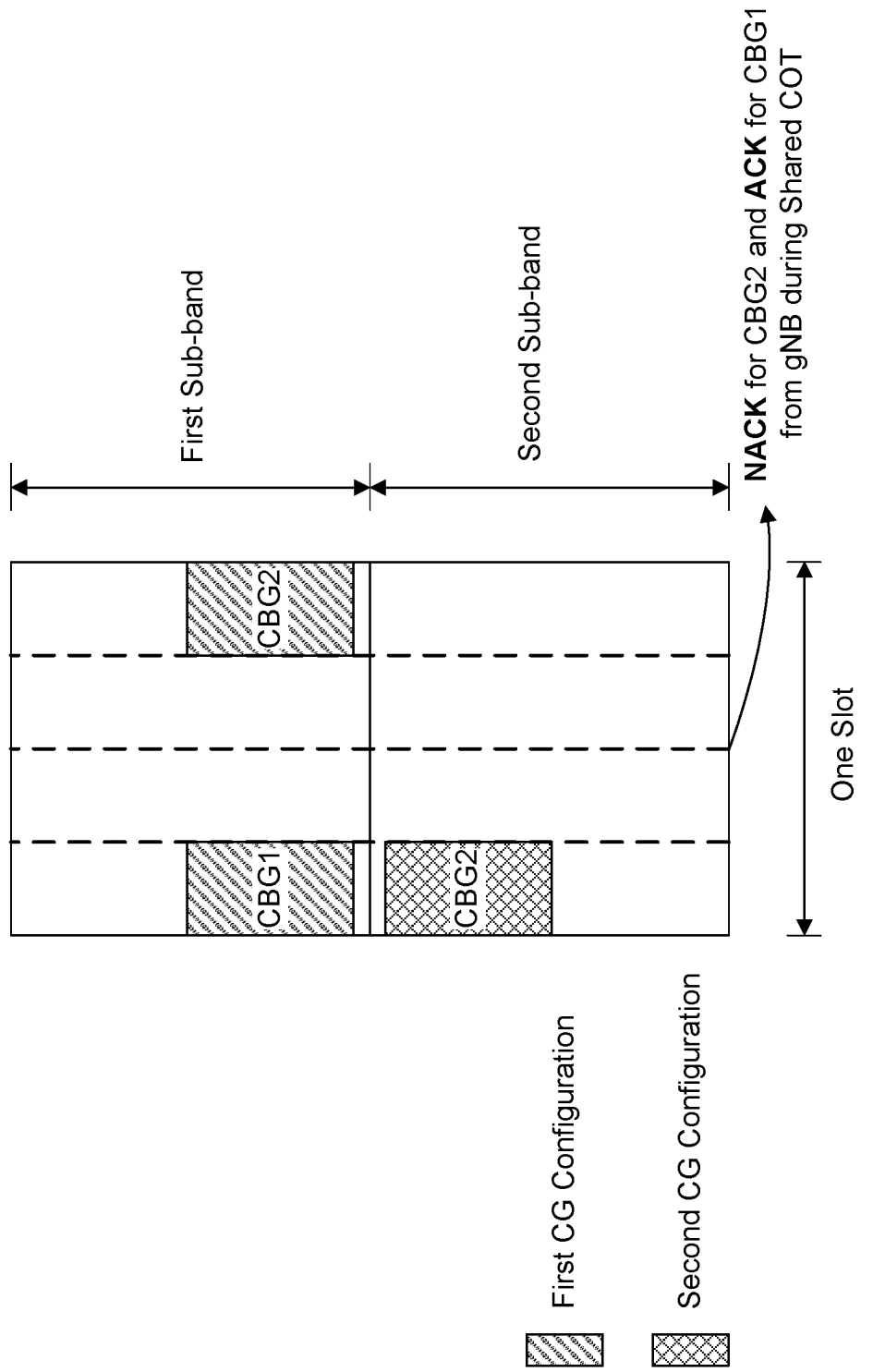
FIG. 3 is a diagram illustrating CBG based retransmission based on HARQ feedback according to embodiments.

FIG. 3 is a diagram illustrating CBG based retransmission based on HARQ feedback according to embodiments. According to embodiments, a WTRU may select a configured grant according to (e.g., based on) HARQ feedback (e.g., received HARQ feedback). According to embodiments, a WTRU may be configured to select any number of CGs based on the received HARQ feedback. For example, there may be case where a WTRU is configured with multiple CGs over different sub-bands. In such a case, a WTRU may initially transmit the CBGs over CGs that are located on different sub-bands. Further in such a case, upon receiving HARQ-ACK feedback of (e.g., for, associated with, etc.) those transmissions, the WTRU may re-select the CGs on which the transmissions were successfully received, and the WTRU may (e.g., then) map CBG retransmissions on those CGs.

According to embodiments, a WTRU may select any number of CGs according to (e.g., based on) a channel access category. According to embodiments, a WTRU may be configured with multiple CG configuration. According to embodiments, a WTRU may select any number (e.g., zero, one, etc.) of the configurations based on the LBT and/or channel access category, for example, to be used for transmission. According to embodiments, a WTRU may be configured to select a CG with small time domain allocation, for example, in a case where a gNB is sharing its channel occupancy time with WTRUs. In such a case, a WTRU may determine, for example, based on downlink signaling, that the gNB reserved the channel and that an uplink transmission may use (e.g., be performed using) channel access category 2. In such a case, the WTRU may (e.g., then) select the CG transmission having (e.g., with) a transmission time less than a maximum time allowed for channel access category 2.

Figure 4:
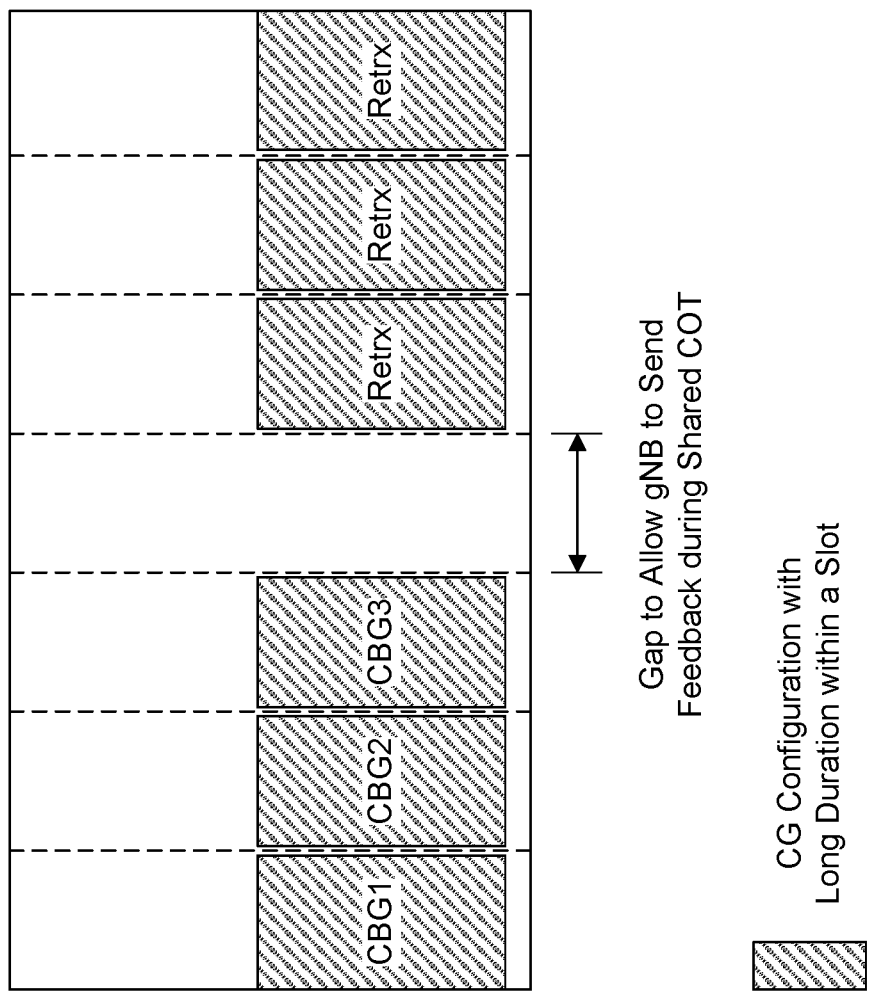
FIG. 4 is a diagram illustrating a CG configuration with a long duration according to embodiments.

FIG. 4 is a diagram illustrating a CG configuration with a long duration according to embodiments.

According to embodiments, a WTRU may select a CG configuration having (e.g., with) a longer duration, and which includes (e.g., consists) of multiple resources for CBG based transmission and resources for (e.g., potential) retransmissions, as shown in FIG. 4. According to embodiments, there may be a case where a WTRU initiates channel access procedure and shares the channel occupancy time with the gNB, for example, to send the HARQ-ACK feedback for the transmitted CBGs. In such a case, according to embodiments, the WTRU may select and/or use the CG configuration having the longer duration, for example, as described with reference to FIG. 3. According to embodiments, in a case where the gNB transmits a NACK for the all the CBGs, the WTRU may use the remaining opportunities for CBG retransmissions. According to embodiments, the gNB may assign resources for CBG retransmissions to another WTRU, for example, in a case where the CBG transmission succeeded at the first transmission.

According to embodiments, a WTRU may indicate, for example, to a gNB, a transmission configuration. According to embodiments, a WTRU may be configured to indicate transmission parameters of any number of CG transmissions, for example, to the gNB. According to embodiments, a WTRU may be configured to indicate any number of CBGs included in (e.g., that are part of) a CG transmission. For example, a WTRU may indicate the number of CBGs in (e.g., as) uplink control information (UCI), for example, multiplexed with a CG physical uplink shared channel (PUSCH). According to embodiments, a WTRU may be configured to indicate a CBG index of a CBG transmission. For example, there may be a case where a WTRU transmits different CBGs in different CG transmissions. In such a case, a WTRU may include the CBG index on (e.g., with) each CG transmission along with the total number of CBGs.

Configured Grant UCI

According to embodiments, uplink control information (UCI) content may be any of selected and prioritized, for example, by a WTRU. According to embodiments, content included in a configured grant (CG) UCI (CG-UCI) may be selected and/or prioritized for transmission according to, for example, a variety of methods and/or characteristics. According to embodiments, a WTRU may be configured to transmit a CG-UCI and (e.g., along with) a CG-PUSCH transmission. According to embodiments, a CG-UCI may include (e.g., may include information/content indicating, may include content including/indicating) any of: a WTRU ID, uplink power control information, HARQ process ID and/or Redundancy Version (RV) for uplink transmission, Modulation and Coding Scheme (MCS) and/or code block group (CBG) related information for an uplink transport block, and/or information associated with COT sharing with a gNB (e.g., information regarding sharing a COT with a gNB).

According to embodiments, CG-UCI may be control information (e.g., may include content) that is different than other (e.g., conventional) UCI, for example, such as used in NR Rel-15. According to embodiments, CG-UCI may include a set of contents, that, for example, may be associated with (e.g., correspond to) a (e.g., certain, specific, several, etc.) CG-CCI format. According to embodiments, different CG-UCI formats may include (e.g., have, indicate, etc.) different contents. For example, a CG-UCI format 0 may include any of a HARQ process ID and a RV, and a CG-UCI format 1 may include any of a HARQ process ID, a RV, and COT sharing information.

According to embodiments, content of (e.g., included in) a CG-UCI may be determined by a WTRU. For example, according to embodiments, a WTRU may be configured to determine content of a CG-UCI based on a size of a CG-PUSCH resource. According to embodiments, different content of (e.g., different sets of information included in) CG-UCI may correspond to different CG-UCI formats. According to embodiments, a WTRU may determine any of CG-UCI content and format according to any of: (1) a number of symbols allocated for a CG PUSCH; (2) any of a number of interlaces allocated to a CG-PUSCH or a size of interlace(s); (3) a number of physical resource blocks (PRBs) allocated to a CG-PUSCH; (4) number of aggregate slots of CG-PUSCH; (5) any of a number of listen before talk (LBT) bandwidths allocated to a CG-PUSCH or whether a CBG based transmission is used; (6) a (e.g., type of) LBT used to access the channel (e.g., a channel access category); (7) any of whether a UCI is configured to be transmitted with the CG-PUSCH and/or the size of the UCI; (8) a number of HARQ processes with pending HARQ feedback; and (9) UCI type.

According to embodiments, in a case of a WTRU determining any of CG-UCI content and format according to a number of symbols allocated for CG PUSCH, a WTRU may be configured (e.g., pre-configured) with a plurality of CG-UCI contents. For example, a WTRU may be pre-configured with multiple CG-UCI contents, wherein each content corresponds to a transmission duration (e.g., a different length of CG-PUSCH). According to embodiments, in a case of a two symbol PUSCH duration, such may carry CG-UCI with (e.g., only) a UE ID, and in a case of a four symbol PUSCH, such may carry CG-UCI with any of a UE ID, a HARQ ID, and a RV. According to embodiments, a WTRU may be any of configured, pre-configured, or semi-statically configured with a mapping between PUSCH duration and any of CG-UCI content and format. According to embodiments, a WTRU may be configured with any of CG-UCI format(s) and content along with (e.g., in addition to) a CG-PUSCH configuration.

According to embodiments, any of CG-UCI content and a format may be determined (e.g., selected by a WTRU) according to any of the number of interlaces allocated to a CG-PUSCH and/or a size of an interlace. According to embodiments, a WTRU may determine any of CG-UCI content and format according to a (e.g., total) number of PRBs allocated to a CG-PUSCH (e.g., for a CG-PUSCH transmission). According to embodiments, a WTRU may determine any of CG-UCI content and format according to a number of aggregate slots of CG-PUSCH, for example, based on a number of repetitions (e.g., for which the WTRU is configured) for a CG transmission.

According to embodiments, a WTRU may determine any of CG-UCI content/format according to any of: (1) a number of LBT bandwidths (e.g., available channel bandwidths) allocated to a CG-PUSCH; and (2) whether a CBG based transmission is used. For example, a WTRU may include CBG related information, such as a CBG Transmission Indication (CBGTI) and CBG Flushing Indication (CBGFI) (e.g., only) for the case of multiple LBT bandwidths (e.g. more than two LBT bandwidths). According to embodiments, a WTRU may determine CG-UCI content and/or format according to a channel access category, for example, according to a LBT used to access the channel. According to embodiments, a WTRU may include COT sharing information (e.g., only) in the case of category 4 channel access (e.g., cat4 LBT), or any other similar and/or suitable category of channel access. According to embodiments, a WTRU may determine any of CG-UCI content and format according to whether a UCI is configured to be transmitted with the CG-PUSCH and/or a size of the UCI. For example, a WTRU may be configured to transmit HARQ-ACK feedback of the downlink transmissions with a CG-PUSCH transmission. As another example, a WTRU may be configured to transmit a CSI report with a CG-PUSCH transmission.

According to embodiments, a WTRU may select the CG-UCI content according to (e.g., based on) a number of UCI bits (e.g., of a transmission). According to embodiments, a WTRU may determine any of CG-UCI content and format according to a number of HARQ processes having (e.g., pending) HARQ feedback. For example, a WTRU may determine the CG-UCI content and/or the format according to the number of ACK/NACK bits. According to embodiments, a WTRU may determine any of CG-UCI content and format according to UCI type. According to embodiments, a WTRU may determine the CG-UCI content and/or the format according to whether any of a CSI report, a HARQ ACK, and/or a Scheduling Request (SR) is reported to the gNB. For example, a WTRU may consider the number of bits needed to indicate the selected SR configuration, for example, to determine any of the CG-UCI content and/or format.

Configured Grant Transmission Over Multiple Repetitions

According to embodiments, a WTRU may (e.g., be configured to) split CG-UCI content over any number of (e.g., different, multiple, certain, etc.) repetitions of CG-PUSCH transmission. For example, according to embodiments, a WTRU may transmit different CG-UCI contents for the same CG-PUSCH transmission (e.g., occurring) in different repetitions of a CG-PUSCH transmission. According to embodiments, there may be a case of a WTRU configured with a CG-PUSCH transmission having 2 repetitions. In such a case, the same transport block may be repeated in the repetition (e.g., transmission) opportunities. In such a case, during the first transmission (e.g., the first repetition), the WTRU may include (e.g., only) its WTRU ID, and in the second transmission (e.g., the second repetition) the WTRU may include the HARQ process ID and RV of the transport block. According to embodiments, as another example, in the first repetition a WTRU may include its WTRU ID and COT sharing with the gNB information. According to embodiments, a WTRU may be configured to determine whether to split CG-UCI content (e.g., to include in transmission repetitions) according to any of: (1) a size and/or contents of CG-UCI; (2) a number of (e.g., configured) repetitions associated with (e.g., of, for, etc.) a CG transmission; (3) a size of UCI and/or whether UCI is configured to be transmitted with a CG-PUSCH transmission; (4) a priority of the UCI to be multiplexed with a CG-PUSCH transmission; and (5) whether the same number of data bits may be maintained (e.g., for repetitions of CG-PUSCH transmission).

According to embodiments, a WTRU may split CG-UCI according to any of a size and contents of the CG-UCI. For example, a WTRU may split UCI over different transmissions in a case where more than one UCI type is (e.g., needs to be) reported. According to embodiments, a WTRU may split CG-UCI according to a number of configured repetitions for a CG transmission. For example, in a case where a WTRU is configured with a number of repetitions that is above a value (e.g., a configured threshold), then the WTRU may split CG-UCI into multiple messages and the WTRU may transmit such over different (e.g., multiple, sequential, serial, etc.) repetitions. According to embodiments, a WTRU may split CG-UCI according to a size of UCI. According to embodiments, a WTRU may split CG-UCI according to whether a UCI is configured to be transmitted with a CG-PUSCH. For example, a WTRU may be configured to transmit HARQ-ACK feedback of the downlink transmissions with a CG-PUSCH transmission, for example, according to a certain size of a CG-PUSCH transmission. As another example, a WTRU may be configured to transmit a CSI report with a CG-PUSCH transmission, for example, according to a (e.g., different) certain size of a CG-PUSCH transmission. According to embodiments, a WTRU may select CG-UCI content according to a number of UCI bits.

According to embodiments, a WTRU may split CG-UCI according to a priority, for example, a priority of the UCI to be multiplexed with a CG-PUSCH. According to embodiments, a WTRU may be configured to transmit UCI along with CG-PUSCH transmission. In such a case, a WTRU may determine a priority of the UCI, for example, based on the content of the UCI. In such a case, for example, HARQ-ACK feedback may have a higher priority over a CSI report. According to embodiments, in a case where a UCI priority is higher than CG-UCI priority, a WTRU may determine whether (e.g., or not) to split the CG-UCI content over multiple repetitions. According to embodiments a WTRU may be configured with (e.g., information indicating, associated with, etc.) any of priority of different UCIs and a priority of a CG-UCI (e.g., a CG-UCI priority). According to embodiments, a WTRU may be (e.g., semi-statically) configured with such priority information using RRC signaling and/or any other suitable type of signaling. According to embodiments, a WTRU may split CG-UCI according to whether the same number of data bits can be maintained. For example, in a case where the same number of data bits received from higher layers may be contained in a repetition, a WTRU may change the UCI content for a (e.g., each) repetition.

According to embodiments, a WTRU may change a rate matching factor between repetitions (e.g., from one repetition to the next), which may be referred to as a beta factor for rate matching. According to embodiments, a WTRU may keep the same UCI bits across repetitions and may change the rate matching factor (e.g., the beta factor) from one repetition to the next, for example, in order to increase reliability of the UCI across repetitions and/or to increase reliability of the PUSCH across repetitions. According to embodiments, for example, a WTRU may use a first (e.g., more reliable) beta factor in a first repetition for UCI multiplexing, and in the next repetition, the WTRU may decrement the rate matching factor (e.g., the beta factor), for example, to allow better reliability for the PUSCH bits.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices including the constraint server and the rendezvous point/server containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method for a wireless transmit/receive unit (WTRU) for performing configured grant (CG) uplink (UL) transmission, the method comprising:

receiving configuration information indicating a plurality of CG configurations for CG UL transmission;

transmitting a first CG UL transmission, which includes a plurality of code block groups (CBGs), via first CG UL transmission resources included in two or more sub-bands of a first set of available sub-bands based on: (1) a number of the CBGs for transmission, and (2) transmission parameters of a first CG configuration;

receiving CBG-based hybrid automatic repeat request acknowledgment (HARQ-ACK) feedback information associated with the CBGs;

determining second CG UL transmission resources that are entirely within the two or more sub-bands of the first set of available sub-bands based on: (1) the first CG UL transmission resources associated with the CBG-based HARQ-ACK feedback information, (2) a number of one or more of the CBGs for retransmission, and (3) transmission parameters of a second CG configuration; and transmitting a second CG UL transmission, which includes the one or more of the CBGs for retransmission, via the second CG UL transmission resources.

2. The method of claim 1, further comprising:
transmitting the first or the second CG UL transmission according to any of: (1) an active bandwidth part (BWP) size; (2) a number of CGs selected for transmissions by the WTRU at a slot or transmission opportunity; (3) any of a number of physical resource blocks (PRBs), a number of symbols within a slot, and/or a modulation and coding scheme (MCS) of the selected CGs; (4) a bandwidth size of an unlicensed channel; (5) a number of any of multi-channel sub-bands or listen before talk (LBT) sub-bands to which the selected CGs map; and/or (6) a buffer size status of a WTRU.

3. The method of claim 1, further comprising:
determining the number of the CBGs included in the first CG UL transmission according to information associated with a plurality of CGs; and
transmitting the first CG UL transmission via the first CG UL transmission resources included in the plurality of CGs.

4. The method of claim 1, further comprising:
determining the first CG configuration according to any of: a time domain allocation of a plurality of CGs, a frequency domain allocation of the CGs, a logical channel priority or latency requirements, a logical channel group, HARQ feedback, and/or a channel access category.

5. The method of claim 1, wherein the configuration information indicates any of: a number of PRBs, a number of symbols, and/or a modulation and coding scheme associated with transmission within a respective CG.

6. The method of claim 1, wherein the configuration information indicating the plurality of CG configurations for CG UL transmission is received from a network via RRC signaling.

7. The method of claim 1, further comprising:
indicating, to a network, transmission parameters associated with any of the first and the second CG UL transmissions.

8. The method of claim 1, wherein any of the first and the second CG UL transmissions is a CG Physical Uplink Shared Channel (CG-PUSCH) transmission including a set of CG uplink transmission information (CG-UCI).

9. The method of claim 8, wherein any of content of the set of the CG-UCI or a format for transmitting the set of the CG-UCI is determined according to any of: (1) a number of symbols allocated for the CG-PUSCH transmission; (2) any of a number of interlaces allocated to the CG-PUSCH transmission or a size of the interlaces; (3) a number of physical resource blocks (PRBs) allocated to the CG-PUSCH transmission; (4) number of aggregate slots of the CG-PUSCH transmission; (5) a number of LBT bandwidths allocated to the CG-PUSCH transmission; (6) a type of LBT used to access the first set of available sub-bands; (7) any of whether a UCI is configured to be transmitted with the CG-PUSCH transmission and/or the size of the UCI; (8) a number of HARQ processes with pending HARQ feedback; and (9) a UCI type.

10. The method of claim 9, wherein the format for transmitting the set of the CG-UCI corresponds to the content of the set of CG-UCI.

11. A wireless transmit/receive unit (WTRU) comprising:
a processor, memory, and a transceiver which are configured to:
receive configuration information indicating a plurality of CG configurations for configured grant (CG) uplink (UL) transmission,
transmit a first CG UL transmission, which includes a plurality of code block groups (CBGs), via first CG UL transmission resources included in two or more sub-bands of a first set of available, sub-bands based on: (1) a number of the CBGs for transmission, and (2) transmission parameters of a first CG configuration,
receive CBG-based hybrid automatic repeat request acknowledgment (HARQ-ACK) feedback information associated with the CBGs,
determine second CG UL transmission resources that are entirely within the two or more sub-bands of the first set of available sub-bands based on: (1) the first CG UL transmission resources associated with the CBG-based HARQ-ACK feedback information, (2) a number of one or more of the CBGs for retransmission, and (3) transmission parameters of a second CG configuration, and
transmit a second CG UL transmission, which includes the one or more of the CBGs for retransmission, via the second CG UL transmission resources.

12. The WTRU of claim 11, further configured to transmit the first or the second CG UL transmission according to any of: (1) an active bandwidth part (BWP) size; (2) a number of CGs selected for transmissions by the WTRU at a slot or transmission opportunity; (3) any of a number of physical resource blocks (PRBs), a number of symbols within a slot, and/or a modulation and coding scheme (MCS) of the selected CGs; (4) a bandwidth size of an unlicensed channel; (5) a number of any of multi-channel sub-bands or listen before talk (LBT) sub-bands to which the selected CGs map; and (6) a buffer size status of a WTRU.

13. The WTRU of claim 11, wherein the processor, memory, and the transceiver are configured to:
determine the number of the CBGs included in the first CG UL transmission according to information associated with a plurality of CGs; and
transmit the first CG UL transmission via the first CG UL transmission resources included in the plurality of CGs.

14. The WTRU of claim 11, wherein the processor, memory, and the transceiver are configured to determine the first CG configuration according to any of: a time domain allocation of a plurality of CGs, a frequency domain allocation of the CGs, a logical channel priority or latency requirements, a logical channel group, HARQ feedback, and/or a channel access category.

15. The WTRU of claim 11, wherein the configuration information indicates any of: a number of PRBs, a number of symbols, and/or a modulation and coding scheme associated with transmission within a respective CG.

16. The WTRU of claim 11, wherein the configuration information indicating the plurality of CG configurations for CG UL transmission is received from a network via RRC signaling.

17. The WTRU of claim 11, wherein the processor, memory, and the transceiver are configured to indicate, to a network, transmission parameters associated with any of the first and the second CG UL transmissions.

18. The WTRU of claim 11, wherein any of the first and the second CG UL transmissions is a CG Physical Uplink Shared Channel (CG-PUSCH) transmission including a set of CG uplink transmission information (CG-UCI).

19. The WTRU of claim 18, wherein any of content of the set of the CG-UCI or a format for transmitting the set of the CG-UCI is determined according to any of: (1) a number of symbols allocated for the CG-PUSCH transmission; (2) any of a number of interlaces allocated to the CG-PUSCH transmission or a size of the interlaces; (3) a number of physical resource blocks (PRBs) allocated to the CG-PUSCH transmission; (4) number of aggregate slots of the CG-PUSCH transmission; (5) any of a number of any of multi-channel bandwidths or listen before talk (LBT) bandwidths allocated to the CG-PUSCH transmission; (6) a type of LBT used to access the first set of available sub-bands; (7) any of whether a UCI is configured to be transmitted with the CG-PUSCH transmission and/or the size of the UCI; (8) a number of HARQ processes with pending HARQ feedback; and (9) a UCI type.

20. The WTRU of claim 19, wherein the format for transmitting the set of the CG-UCI corresponds to the content of the set of CG-UCI.

* * * * *